United States Patent [19]

Bronstert

[11] Patent Number: 4,972,023
[45] Date of Patent: * Nov. 20, 1990

[54] POLYMERS MODIFIED WITH TERMINAL ACID GROUPS AND THE PREPARATION AND USE OF THESE POLYMERS

[75] Inventor: Klaus Bronstert, Carlsberg, Fed. Rep. of Germany

[73] Assignee: BASA Aktiengesellschaft, Ludwigshafen, Fed. Rep. of Germany

[*] Notice: The portion of the term of this patent subsequent to Mar. 28, 2006 has been disclaimed.

[21] Appl. No.: 170,244

[22] Filed: Mar. 18, 1988

[30] Foreign Application Priority Data

Mar. 25, 1987 [DE] Fed. Rep. of Germany ....... 3709807

[51] Int. Cl.$^5$ ........................................... C08F 267/04
[52] U.S. Cl. .................................... 525/285; 525/375; 525/256; 525/374; 525/379; 525/382
[58] Field of Search ............... 525/285, 375, 256, 374, 525/379, 382

[56] References Cited

U.S. PATENT DOCUMENTS

| | | | |
|---|---|---|---|
| 3,251,812 | 5/1966 | Hsieh | 525/340 |
| 4,465,809 | 8/1984 | Smith | 525/285 |
| 4,647,625 | 3/1987 | Aonuma et al. | 525/375 |
| 4,670,173 | 6/1987 | Hayashi et al. | 525/285 |
| 4,753,991 | 6/1988 | Bronstert | 525/375 |
| 4,816,520 | 3/1989 | Bronstert | 525/375 |

Primary Examiner—John C. Bleutge
Assistant Examiner—Vasu S. Jagannathan
Attorney, Agent, or Firm—Keil & Weinkauf

[57] ABSTRACT

Homopolymers, copolymers or block copolymers obtained from vinylaromatics and/or conjugated dienes and functionally modified at chain ends via amide groups with terminal acid groups or salts thereof, and hydrogenation products of these polymers, which contain salts of functional groups of the formula I, II, III, IV or V

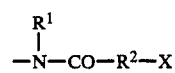

I

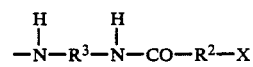

II

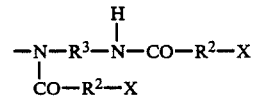

III

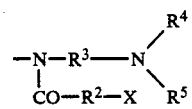

IV

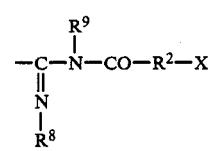

V wherein N is nitrogen, $R^1$ is alkyl or aryl, $R^3$ is a 2-membered to 20-membered bridge in which at least the members adjacent to the nitrogen atoms consist of $-C(R^6, R^7)$ radicals, where $R^6$ and $R^7$ are each hydrogen, alkyl, cycloalkyl or aryl, and the more remote members are not only $-C(R^6, R^7)$ radicals but may furthermore be ether or N-alkyl- or N-arylimino groups, $R^2$ is a divalent organic radical, $R^4$, $R^5$, $R^8$ and $R^9$ are each alkyl or aryl or together form a cyclic bridge, and X is COOH or $SO_3H$ or their salts or complexes and a process for preparing the polymers and copolymers. The polymers and copolymers are used as toughening agents to modify polyurethanes, as a component of hot melt adhesives or as a lubricating oil component.

11 Claims, No Drawings

POLYMERS MODIFIED WITH TERMINAL ACID GROUPS AND THE PREPARATION AND USE OF THESE POLYMERS

The present invention relates to homopolymers, copolymers or block copolymers obtained from vinylaromatics and/or conjugated dienes and functionally modified at the chain end via amide groups with terminal acid groups or salts thereof, and to hydrogenation produces thereof.

European Laid-Open Application EP-A Nos. 22 06 02, 22 06 12 and 21 97 28 describe polymers of all types which have terminal acid groups or salts thereof and are prepared by an anionic method by successive reaction first with ethylene oxide and then with an anhydride followed finally by complexing of the anionic terminal groups. Depending on their structure and composition, the polymers can be used as rubbers or thermoplastic molding materials or for modifying other polymers. However, the properties are unsatisfactory for some applications.

Thus, known processes only permit the introduction of one acid group per chain end in the polymer molecule, which restricts the achievable properties, particularly in the case of high molecular weights. Furthermore, an excess of cyclic anhydrides must be used in order to achieve the conversion rates for the chain ends of more than 80%, which are required for good properties. However, the excess of anhydride is difficult to remove and has an adverse effect on the properties.

It is an object of the present invention to provide polymers having terminal acid groups or salts thereof which have improved properties compared with the known polymers and can be prepared in a reproducible manner and whose properties can be varied over a wide range. In particular, equimolar amounts of anhydride should be sufficient for introducing the terminal groups. Moreover, it should also be possible to introduce two carboxyl groups per chain end.

We have found that these objects are achieved by polymers and processes of the present invention.

It has been found that polymers which can be used as starting polymers are those which contain, at the chain end, one or more, preferably two or more, primary and/or secondary terminal amine groups or a secondary and tertiary terminal amine group, preferably in the form of a lithium amide. Using these polymers, it is possible to achieve conversions of more than 80% with little or no excess cyclic anhydride. If they possess two or more terminal amine groups per chain end, a corresponding number of terminal acid groups can be introduced into the molecule, the anions of the said acid groups having a correspondingly greater action. Compared with known processes, fewer cations or complex formers per acid group may be sufficient for achieving the desired properties.

Thus, according to the invention, homopolymers, copolymers or block copolymers obtained from vinylaromaics and/or conjugated dienes and functionally modified with amino groups, and hydrogenation products thereof, having terminal amine groups of the formulae VI, VII, VIII and IX

VI

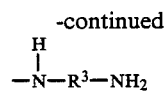

VII

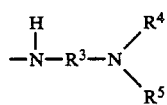

VIII

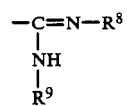

IX in which some or all of the hydrogens on the nitrogens are replaced by metals of group 1 or 2 of the Periodic Table, are reacted with cyclic anhydrides.

Preferred starting polymers are homopolymers, copolymers and block copolymers of vinylaromatics and/or dienes, which are obtained by an anionic method, for example with the aid of organometallic Li initiators, obtained from the corresponding monomers, and then reacted with suitable nitrogen-containing compounds. It is also possible to use polyfunctional Li catalysts. The polymerization is so well known that no further explanation is required here. It does not form a subject of this application. It is described in detail in European Laid-Open Application EP-A No. 21 13 95 and in European Patent Application Nos. 87103893 and 87118011. Examples of particularly suitable compounds are 1,5-diazabicyclo[3.1.0]hexane and its derivatives, as well as Schiff bases of aliphatic or aromatic amines and aldehydes.

Particularly suitable vinylaromatics are styrene, various alkylstyrenes and vinylnaphthalene, suitable dienes are butadiene, isoprene, 2,3-dimethylbutadiene, piperylene, phenylbutadiene and other anionically polymerizable conjugated $C_4$-$C_{12}$-dienes. In addition to the particular homopolymers, the copolymers and the known block copolymers of vinylaromatics and dienes are also suitable, and, depending on the choice of initiator and solvent, block copolymers or copolymers having a random distribution of the monomers can be obtained. The polymers generally have mean molecular weights (weight average $M_w$) of from 500 to 500,000, determined by gel permeation chromatography (GPC) and comparison with standardized polymers used for calibration (cf. G. Glöckner., Polymercharakterisierung durch Flüssigkeitschromalographie, Verlag A. Hüthig, Heidelberg, 1982). The measurement is usually carried out in 0.25% strength by weight solution in tetrahydrofuran at 23° C. and at a flow rate of 1.2 ml/min.

The concentration in the solvent during the preparation of the polymers can vary within wide limits. Technically, it is restricted only by the ability to remove the heat of reaction and adequately to mix the viscous solution formed during the polymerization. For these reasons, concentrations of from 5 to 35% by weight of solid are generally used.

Suitable solvents include aliphatic, cycloaliphatic and aromatic hydrocarbons, for example n-hexane, n-heptane, cyclohexane, toluene, etc. However, it is also possible to use other inert solvents, e.g. tetrahydrofuran, diethyl ether, etc.

The polymerization temperature depends on the monomer, but in general the polymerization is carried out at from −100° C. to +100° C., preferably from −10° C. to 90° C. At these temperatures, the polymerization generally takes place at an adequate velocity.

The hydrogenation is carried out, if necessary, after introduction of the amine groups required according to the invention. It is usually effected with the aid of molecular hydrogen and catalysts based on metals or metal salts of group 8 of the Periodic Table either in the homogeneous or the heterogeneous phase. The processes are known and are described in, for example, U.S. patent application No. 3,113,986, DE-B No. 1,222,266, DE-A No. 2,132,263, DE-B No. 1,116,961 or DE-A No. 1 595,345.

In order to achieve an adequate effect according to the invention, more than 80% of the polymer molecules should carry terminal basic nitrogen groups, as described above. Particularly suitable polymers are those which each contain two basic nitrogens per chain ed, as formulated above.

The reaction with cyclic anhydrides gives polymers having terminal groups of the structures I-V

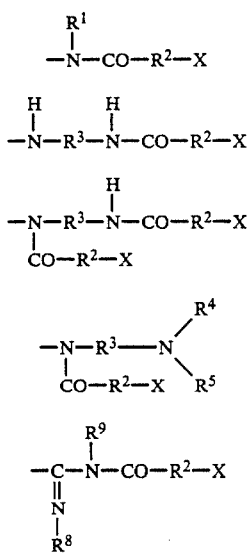

where N is nitrogen, $R^1$ is alkyl or aryL, $R^3$ is a 2-membered to 20-membered bridge in which at least the members adjacent to the nitrogen atoms consist of —$C(R^6, R^7)$ radicals, where $R^6$ and $R^7$ are each hydrogen, alkyl, cycloalkyl or aryl, and the more remote members may be not only —$C(R^6, R^7)$ radicals but also ether N-alkylimino or N-arylimino groups, $R^2$ is a divalent organic radical, $R^4$, $R^5$, $R^8$ and $R^9$ are each alkyl or aryl or together form a cyclic bridge, and X is COOH or $SO_3H$, or their salts or complexes with monovalent, divalent and/or trivalent anions from group 1, 2, 3 or 8 of the Periodic Table.

Divalent organic radicals $R^2$ may be:

—$CH_2$—$CH_2$—, —CH=CH—, —$CH_2$—$CH_2$—$CH_2$—,

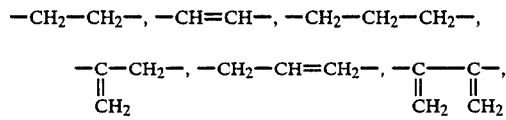

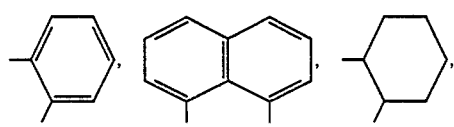

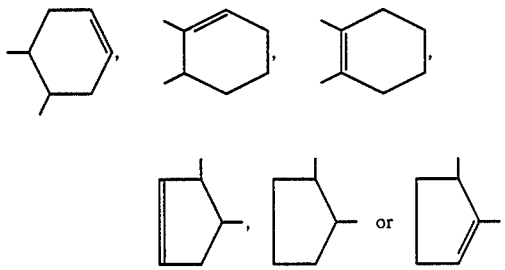

and these radicals may be substituted by alkyl, aryl and/or halogen. In general, suitable divalent radicals $R^2$ are all those in which the substituents X and COOH can form cyclic anhydrides. This takes place particularly readily where 5-membered or 6-membered cyclic anhydride rings can form. Examples are succinic anhydride, β-sulfopropionic anhydride, maleic anhydride, glutaric anhydride, phthalic anhydride, the isomeric di- and tetrahydrophthalic anhydrides, cyclohexane-1,2-dicarboxylic anhydride, the various isomeric naphthalenedicarboxylic anhydrides in which the carboxyl groups are adjacent or are located in the 1,8-position on the ring, etc., as well as o-sulfobenzoic anhydride and others.

The anhydrides, preferably in solution in, for example, cyclohexane, toluene or tetrahydrofuran, are added to the solution of the polymers. If they are sparingly soluble, they may also be added in the form of a suspension, in which case they should be very finely distributed in order to ensure an adequate reaction rate. Dispersing can be effected, for example, using a turbine mixer, such as Ultraturrax.

The reaction is carried out in general at from −10° to 70° C., preferably from 0° to 50° C. Below this range the reaction takes place very slowly, while above this range undesirable side reactions increase.

If polymers having terminal Li amide groups are used as starting materials, the reaction rapidly gives, at the stated temperatures, the polymers functionalized according to the invention. These polymers themselves have properties which are between those of 2-block and 3-block copolymers. The ionic bonding of the chain ends can be reinforced if the hydroxides, alcoholates or other suitable derivatives of polyvalent metals are added. Examples of particularly suitable substances are the Al alcoholates which are readily soluble in organic solvents, but the alcoholates of zinc may also be used. The effect is most pronounced, for example in the case of an Al alcoholate, if about one mole of Al is present per mole of carboxyl group in the polymer.

If polymers having free amino groups are used for the reaction with the cyclic dicarboxylic anhydrides, it may be advantageous to increase the reaction temperature to 70°–100° C., particularly if two amino groups per chain end are to be reacted. If it is intended to convert the resulting carboxyl groups into salts, compounds of polyvalent metals, in particular those of aluminum, are preferably used after the reaction, as described above.

The polymers according to the invention can be isolated from the solvent in which they have been prepared by any known method, such as precipitation with a nonsolvent, evaporation of the solvent in an evaporator or devolatilization apparatus, such as an extruder, or by steam distillation. Isolation and purification do not form subjects of the invention.

The polymers according to the invention are suitable for many applications. For example, molding materials consisting of 2-block copolymers styrene→butadiene→novel terminal groups as an Al complex have mechanical behavior similar to that of styrene/butadiene/styrene 3-block copolymers. They exhibit, for example, elastomeric properties and elongation at break of up to 1000% or higher but possess better processibility than 3-block copolymers. They are suitable as thermoplastics and for toughening thermoplastic materials based on polystyrene or polymers compatible with polystyrene, such as polyphenylene oxide or its mixtures with polystyrene. Novel polymers or block copolymers having free carboxyl groups are also suitable for modifying polyurethanes and, in the form of their salts, as components of hot melt adhesives. The latter then possess particularly good adhesion both to polar and metallic surfaces and to polymers, such as polystyrene or polyolefins. Finally, novel hydrogenated polymers containing not less than 40% of butadiene or isoprene are also suitable for improving the properties of lubricating oils. As lubricants, these then have, inter alia, an improved dispersing action for carbon black and deposits such as those formed during the operation of internal combustion engines.

The Examples which follow illustrate the invention without restricting it. Starting materials and solvents are purified in the manner familiar to the skilled worker for use in anionic polymerization.

EXAMPLE 1

Preparation of a block copolymer consisting of 17% of styrene→83% of butadiene of molecular weight 60,000→propylenediaziridine→succinic anhydride→Al complex 3,000 cm$^3$ of cyclohexane and 104 g (1 mole) of purified styrene are introduced into a 4 liter three-necked flask which has been rinsed out under pure nitrogen with a solution of butyllithium in cyclohexane and is equipped with a stirrer, a thermometer and a nozzle with a rubber membrane.

A 1.4 molar solution of sec-butyllithium in cyclohexane is added to the thoroughly stirred styrene solution at 50° C. using an injection syringe until a permanent pale orange coloration is obtained. Directly thereafter, 9 millimoles of sec-butyllithium are added. The solution, which now has an intense orange color, warms up. Polymerization of the styrene is complete after 1 hour at 70° C. 736 cm$^3$ (500 g) of butadiene are then run in over 2 hours at this temperature. After a further hour, the mixture is cooled and a sample containing about 10 g of polymer is taken and used for the determination of the solution viscosity and the molecular weight (molecular weight by GPC=60,000, Mw/Mn=1.07). 11 millimoles of a 20% strength by weight solution of propylene diaziridine (1,5-diazabicyclo[3.1.0]hexane) in toluene are added to the major part of this solution at 40° C. by means of an injection syringe through the rubber membrane, the blocked polymer being formed. By potentiometric titration with perchloric acid in a chlorobenzene/glacial acetic acid mixture, the content of basic nitrogen is determined as 0.045% for a sample purified by precipitation with alcohol, dissolution in toluene and reprecipitation with alcohol and dried under reduced pressure at 70° C. The total nitrogen determined by the Kjeldahl method is 0.049%.

A finely divided suspension of 10 millimoles of succinic anhydride in cyclohexane is then added to the major part of the solution. The suspension is prepared by milling 10 g of succinic anhydride in 100 cm$^3$ of cyclohexane using an Ultraturrax stirrer. After one hour at 40° C., 10 millimoles of hydrogen fluoride dissolved in 10 cm$^3$ of tetrahydrofuran are added.

The solution is divided into 3 equal parts, and these are mixed with 1, 2 and 3 millimoles of Al isopropylate dissolved in toluene, and are precipitated with alcohol and dried under reduced pressure at 70° C. The products have the following viscosity numbers (VN, measured on a 0.5% strength solution in toluene):

| Polymer without terminal group | 75.5 |
| Modified polymer from solution 1 | 86.6 |
| Modified polymer from solution 2 | 93.4 |
| Modified polymer from solution 3 | 97.8 |

While the unmodified polymer has no strength and can easily be pulled to pieces with the fingers, as is familiar to the skilled worker in the case of 2-block copolymers, pressed sheets of the other polymers exhibit resilience and toughness as the Al content increases.

EXAMPLE 2

Block copolymer of 9% of styrene→91% of butadiene →propylenediaziridine→succinic anhydride→Al salt.

As described in Example 1, 560 g of a block copolymer containing butadiene and 9% of styrene and having a molecular weight of 60,000 are prepared (1)*, and the copolymer is blocked at the butadiene chain end with 1,5-diazabicyclo[3.1.0]hexane (2)* To eliminate the methylene group, 10.6 millimoles of hydrazine hydrate are added to the solution of the polymer, the mixture is washed with three times 2 l of water, and suspended and dissolved water still present is separated off from the organic solution (3)* 21.1 millimoles of succinic anhydride are then added to the solution at the boiling point of the cyclohexane, and the mixture is cooled after 30 minutes, stabilized (4)* with 1 g of Irganox 1076** and divided into four equal portions, to which the different amounts, stated below, of a solution of aluminum triisopropylate in toluene are added. The polymers are precipitated by pouring into a 3-fold volume of alcohol, are kneaded thoroughly with alcohol and dried under reduced pressure at 70° C. until the weight remains constant. The following properties are measured for the polymers (5)*, (6)*, (7)*, (8)*

\* Samples are taken at the points denoted by (1) to (8)
\*\* Trade name of Ciba-Geigy, Basle

| No. | Composition of sample | Molar ratio Polymer:Al | VN*** | MW (GPC) | N content |
|---|---|---|---|---|---|
| (1) | Block copolymer St; Bu | — | 81.4 | 60,000 | |
| (2) | Polymer (1) + diaziridine | — | 83.5 | — | 0.05 |
| (3) | Polymer (2) hydrolysed | — | 87.1 | | |

-continued

| No. | Composition of sample | Molar ratio Polymer:Al | VN*** | MW (GPC) | N content |
|---|---|---|---|---|---|
| (4) | Polymer (3) + 2 moles of succinic anhydride | — | 101 | | |
| (5) | Polymer (4) + Al isopropylate | 1:0.47 | 128 | | |
| (6) | Polymer (4) + Al isopropylate | 1:0.56 | 138 | | |
| (7) | Polymer (4) + Al isopropylate | 1:1.33 | 180 | | |
| (8) | Polymer (4) + Al isopropylate | 1:2.67 | 180 | | |

***0.5% in toluene

The numbers show that the solution viscosity of the polymers increases sharply from the 2-block copolymer to the modified polymers to which aluminum isopropylate has been added. However, amounts of aluminum compounds above a molar ratio of 1:1.33 do not result in any further increase in viscosity.

The following properties were determined for pressed sheets obtained by pressing the polymers (1), (4), (5), (6) and (7) at 160° C. between teflon sheets with 1 mm steel spacers:

*** 0.5% in toluene

| Polymer | Elastomeric properties | Modulus 300% N/mm² | Elongation at break % | Tensile strength N/mm² |
|---|---|---|---|---|
| 1 | — | — | — | — |
| 4 | — | — | — | — |
| 5 | + | 0.80 | 1,500 | 4.0 |
| 6 | ++ | 1.30 | 1,050 | 3.15 |
| 7 | +++ | 1.40 | 810 | 2.60 |

− None
+ Poor
++ Satisfactory
+++ Good

While polymers (1) and 4) and (4) have no resilience and tear virtually without resistance, polymers (5) to (7), in this order, show increasing mechanical strength and elastomeric properties.

EXAMPLE 3

Preparation of a novel block copolymer consisting of 9% of styrene→91% of isoprene→diaziridine→maleic anhydride (MA) and having a molecular weight (MW) of 60,000 and containing 2 moles of terminal carboxyl groups and Al salt.

The preparation was carried out as described in Example 2, except that isoprene is used instead of butadiene, and maleic anhydride instead of succinic anhydride. The following properties are measured for the polymers:

| No. | Composition of sample | Molar ratio Polymer:Al | VN*** | MW (GPC) | N content Kieldahl |
|---|---|---|---|---|---|
| (1) | Block copolymer St; isoprene | — | 90.5 | 60,000 | — |
| (2) | Polymer 1 + diaziridine | — | 95 | — | 0.051% |
| (3) | Polymer 2 hydrolyzed | — | 114.3 | — | — |
| (4) | Polymer 3 + 2 moles of MA | — | 139 | — | — |
| (5) | Polymer 4 + Al isopropylate | 1:1 | 201 | — | — |
| (6) | Polymer 4 + Al isopropylate | 1:1.33 | 230 | — | — |
| (7) | Polymer 4 + Al isopropylate | 1:2.67 | 230 | — | — |
| (8) | Polymer 4 + Al isopropylate | 1:4 | 233 | — | — |

The solution viscosity increases sharply from the unmodified polymer to the Al salts up to the polymer/Al ratio of 1:1.33, but does not increase further above this ratio. The polymers 5 to 8 are elastomeric and have good elongation at break ($\eta$300%).

What is claimed is:

1. A homopolymer, copolymer or block copolymer obtained from vinylaromatics and/or conjugated dienes which is functionally modified at the chain ends via amide groups with terminal acid groups or salts thereof, or a hydrogenation product thereof, which contains the salts of functional groups of the formula I, II, III, IV, or V:

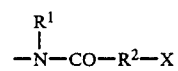

I

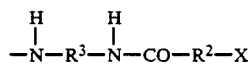

II

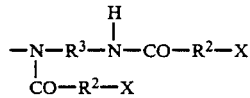

III

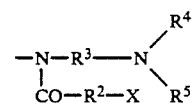

IV

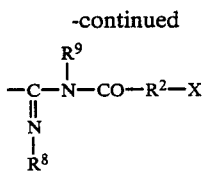

where N is nitrogen, $R^1$ is alkyl or aryl, $R^3$ is a 2-membered to 20-membered bridge in wherein the members of the bridge consist of —$C(R^6, R^7)$— radicals, where $R^6$ and $R^7$ are each hydrogen, alkyl, cycloalkyl, aryl, and ether, N-alkyl or N-arylimino groups, $R^2$ is a divalent organic radical, $R^4$, $R^5$, $R^8$ and $R^9$ are each alkyl or aryl or together form a cyclic bridge, and X is COOH or SO$_3$H or their salts or complexes with monovalent, divalent and/or trivalent anions from group 1, 2, 3 or 8 of the Periodic Table.

2. A polymer as defined in claim 1, wherein $R^2$ is

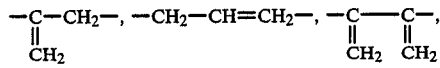

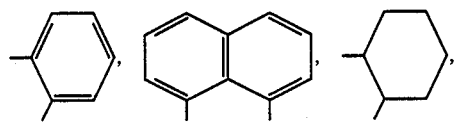

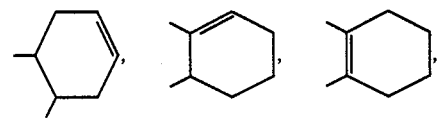

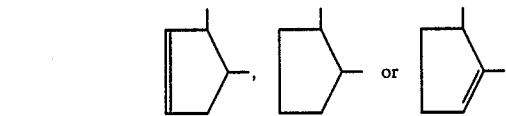

and these radicals in turn may be substituted by alkyl chains and/or halogen.

3. A process for the preparation of a polymer as defined in claim 1, wherein homopolymers and/or copolymers and/or block copolymers obtained from vinylaromatics and/or conjugated dienes, functionally modified with amino groups and prepared by anionic polymerization, or a hydrogenation product thereof, having terminal amine groups of the formulae VI, VII, VIII and IX

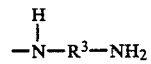

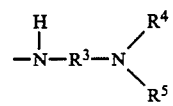

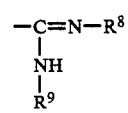

in which some or all of the hydrogen on the nitrogen atoms may be replaced with metals of main group 1 or 2 of the Periodic Table, are reacted with a cyclic anhydride having the bridge $R^2$, the anhydride groups being composed of 2 carboxyl radicals or a carboxyl radical and a sulfonic acid radical and $R^2$ having the above meanings, and the reaction product is then reacted partially or completely or with an excess of cations of metals of group 1 to 3 or 8 of the Periodic Table.

4. A process for the preparation of a polymer as defined in claim 1, wherein a functionally modified polymer having the terminal group $$-\underset{H}{N}-(CH_2)_3-NH_2 \quad \text{or} \quad -\underset{H}{N}-CH_2-C(CH_3)_2-CH_2-NH_2$$

is reacted with 2 moles of a cyclic dicarboxylic anhydride of succinic acid or maleic acid and then converted to a salt.

5. A process for the preparation of a polymer as defined in claim 1, wherein aluminum in the form of an alcoholate is introduced as a counter-cation.

6. A process for the preparation of a blend of a polymer containing more than 40% by weight of dienes, as defined in claim 1, with a thermoplastic material based on polystyrene or polyphenylene oxide or a mixture of this with polystyrene or with a polyurethane, by mixing the components.

7. A hot melt adhesive which contains, as a component, a polymer containing more than 40% by weight of dienes, as claimed in claim 1.

8. A lubricating oil which contains, as a component, a hydrogenated polymer containing more than 40% by weight of dienes, as defined in claim 1.

9. The polymer of claim 1, wherein said polymer is the form of an aluminum salt.

10. The polymer of claim 1, wherein said polymer is in the form of an aluminum complex.

11. The process of claim 3, wherein said polymer is functionally modified with terminal amine groups via reaction with propylene diazirindine.

* * * * *

UNITED STATES PATENT AND TRADEMARK OFFICE
CERTIFICATE OF CORRECTION

PATENT NO. : 4,972,023

DATED : November 20, 1990

INVENTOR(S) : Klaus BRONSTERT

It is certified that error appears in the above-identified patent and that said Letters Patent is hereby corrected as shown below:

On the title page, item [73]

ASSIGNEE: should read --BASF Aktiengesellschaft
Ludwigshafen, Fed. Rep. of
Germany--

Claim 1: column 9, line 6 after "N-arylimino groups," insert

--and, further, wherein the members of the bridge adjacent to the nitrogen atoms consist of $-C(R^6, R^7)$ radicals where $R^6$ and $R^7$ are each hydrogen, alkyl, cycloalkyl or aryl,--

Claim 1: column 9, line 6

"N-alkylor or" should read --N-alkyl- or--

Signed and Sealed this

Nineteenth Day of May, 1992

Attest:

DOUGLAS B. COMER

Attesting Officer

Acting Commissioner of Patents and Trademarks